United States Patent [19]

Nishimura

[11] Patent Number: 4,495,627
[45] Date of Patent: Jan. 22, 1985

[54] CASH ACCOUNTING SYSTEM

[75] Inventor: Katsuji Nishimura, Habikino, Japan

[73] Assignee: Sharp Kabushiki Kaisha, Osaka, Japan

[21] Appl. No.: 403,324

[22] Filed: Jul. 30, 1982

[30] Foreign Application Priority Data

Aug. 7, 1981 [JP] Japan .................. 56-124445
Aug. 10, 1981 [JP] Japan .................. 56-125514

[51] Int. Cl.$^3$ ............................ G06F 15/30
[52] U.S. Cl. ...................... 377/6; 235/425; 235/379; 364/405
[58] Field of Search .............. 377/6, 7, 8, 28; 364/405; 235/379, 425

[56] References Cited

U.S. PATENT DOCUMENTS

| 4,070,564 | 1/1978 | Tucker | 364/405 |
| 4,276,598 | 6/1981 | Inoue et al. | 364/405 |
| 4,317,172 | 2/1982 | Nakano | 364/405 |
| 4,369,442 | 1/1983 | Werth et al. | 377/7 |
| 4,404,649 | 9/1983 | Nunley | 235/379 |

Primary Examiner—John S. Heyman
Attorney, Agent, or Firm—Birch, Stewart, Kolasch & Birch

[57] ABSTRACT

A cash accounting system including a cash register for recording various transactions of money, a counting machine electrically connected with the cash register and operable to count the money used during each of the transactions, a printing member, and a totaling member for totaling according to denomination count data given by the counting machine.

2 Claims, 9 Drawing Figures

CASH REGISTER

Fig. 4(b) COUNTING MACHINE

Fig. 7(a)  CASH REGISTER
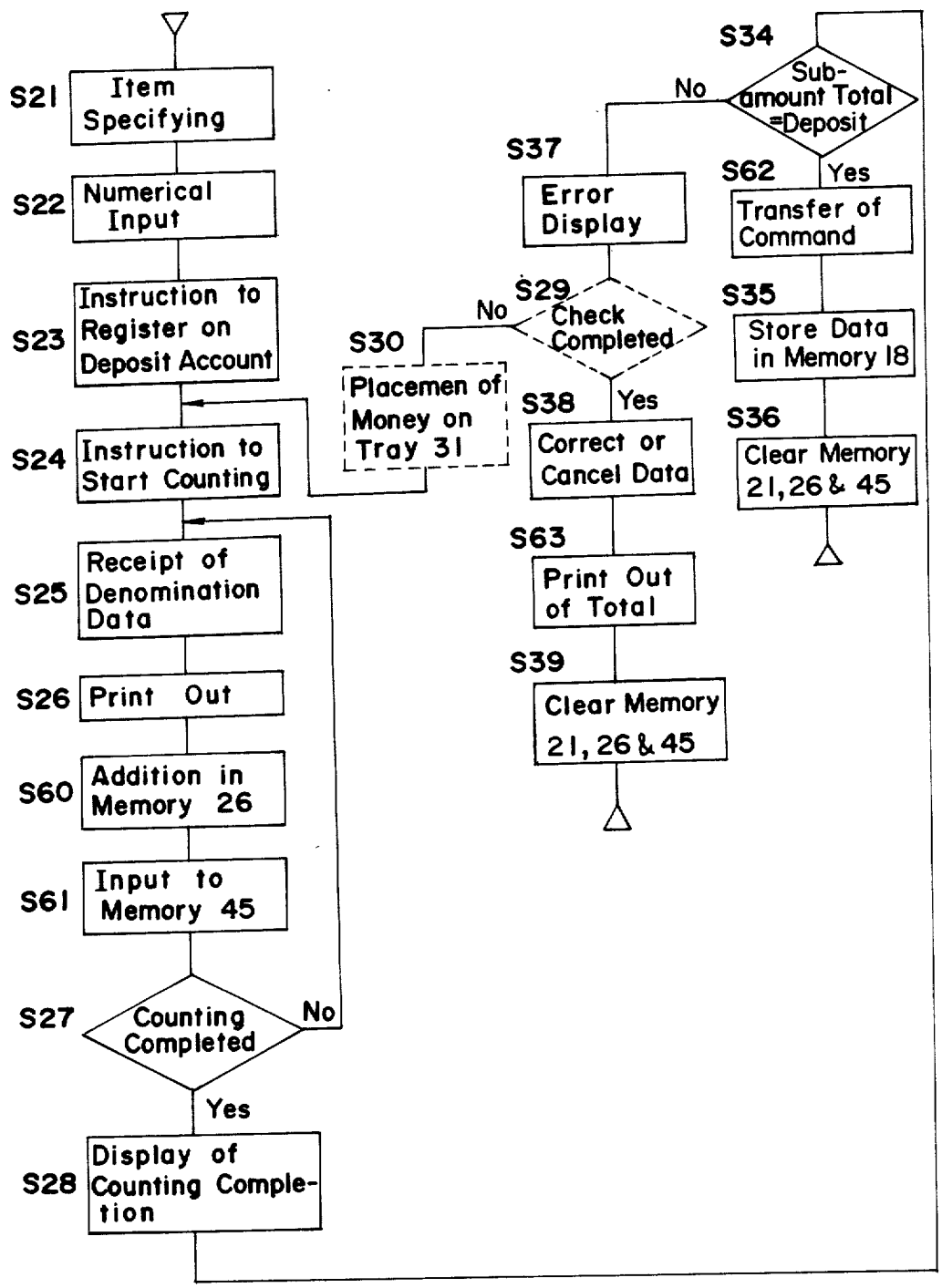

COUNTING MACHINE

CASH ACCOUNTING SYSTEM

BACKGROUND OF THE INVENTION

This invention relates to a cash accounting system of a type wherein a cash register is electrically connected with a cash counting machine for counting the amount of money, including coins and papers, which has been transacted.

A cash register currently used in banks for registering the transactions performed there is of a construction shown in FIG. 1 of the accompanying drawings. Referring to FIG. 1, reference numeral 1 is a function keyboard having a plurality of function keys including a deposit key, item specifying keys and a check key; reference numeral 2 is a key discriminator for discriminating which one of the function keys has been operated; reference numeral 3 is a central processing unit (CPU); reference numeral 4 is a numerical keyboard having a plurality of decimal digit keys; reference numeral 5 is a key encoder; reference numeral 6 is a denomination keyboard 6 having one or more denomination specifying keys; reference numeral 7 is an address counter; reference numeral 8 is a memory unit for storing various data; reference numeral 9 is an input/output control unit for controlling the memory unit 8; reference numeral 10 is a printer; reference numeral 11 is a display unit; and reference numeral 12 is a read-only memory (ROM) for storing a micro-program necessary to control the sequence of operation of the system.

With the conventional cash register of the above described construction and as shown in FIG. 1, in the case where the deposit of, for example, 540 dollars in bills of small denomination, for example, five 100 dollar papers plus four 10 dollar papers, is desired to be registered on a particular ordinary account, the system is operated in a manner as shown in the flow chart of FIG. 2.

Referring to FIG. 2, prior to the cash register being actually utilized and at the initial two succeeding stages (1) and (2), an operator of the cash register manipulates the papers to count and then to record temporarily the amount counted for the purpose of confirmation. The recording of the amount counted is done according to the different denominations. After the total of the sub-amounts recorded according to the different denominations, i.e., the total of 500 dollars and 40 dollars, has been checked against the actual amount of money deposited, and at the stage (3), the operator manipulates the item specifying key to transmit from the function keyboard 1 to the CPU 3 through the key discriminator 2, a signal predicating that the subsequent information to enter the CPU 3 is associated with the ordinary account. At the stage (4), by manipulating the numerical keyboard 4 information is entered that and a money total of 540 dollars is transmitted to the CPU 3. Thereafter at the stage (5) following the stage (4), the operator manipulates the deposit key of the function keyboard 1 to transmit from the function keyboard 1 to the CPU 3 through the key descriminator 2, a signal predicating that the money information at the stage (4) is concerned with a deposit to be registered on the ordinary account. At the stage (6), the operator manipulates the numerical keyboard 4 and the denomination keyboard 6 to transmit to the CPU 3 a signal concerning the sub-amounts temporarily recorded.

When registration of the transaction has been completed as described above, at the stage (7), the operator depresses the check key of the function keyboard 1 so as to instruct the CPU3 to check to see if the total of money deposited, at the stage (4) is equal to the total of the sub-amounts of the stage (6), whereby at the stage (8), the CPU3 performs a checking to see if the amount of money deposited is equal to the total of the sub-amounts. If the both are equal, the various data is, at the stage (9), stored at a predetermined area of the memory unit 8, designated by the address counter 7, under the control of the input/output control unit 9. On the other hand, if the both are not equal, an error display is made at the stage (10) and the operator is assigned to make a reconfirmation by repeating the procedure from the initial stage (1).

The data stored in the predetermined area of the memory unit 8 at the stage (9) is, at the stage (10), printed out on a journal paper or the like and, at the same time, displayed by the display unit 11. It is to be noted that the above-described sequences of operation are controlled by the micro-program stored in the ROM 12.

From the foregoing, it is clear that, during the course of performance of the accounting job, the operator is required to manipulate the money to count it prior to the cash register being actually utilized. The above described conventional cash register has numerous disadvantages. For example, where the money to be deposited is large and/or includes various denominations, the operator must perform a lot of manual work for a prolonged period of time, resulting in reduction in efficiency and also in an unpleasant feeling on the part of the customer.

SUMMARY OF THE INVENTION

Accordingly, an essential object of the present invention is to provide an improved cash accounting system substantially free from the above discussed disadvantages and inconveniences inherent in the prior art cash register.

In order to accomplish this and other objects of the present invention, a cash accounting system of a type wherein a cash register for registering various transactions of money is electrically connected with a counting machine for counting the money including papers and coins used during each of the transactions is disclosed. This system is provided with a printing means and a totaling means for totaling according to denominations count data provided by said counting machine, with said printing means and said totaling means being incorporated in either one of said cash register and said counting machine, whereby money information developed by said counting machine as a result of a counting operation is printed out by said printing means in response to completion of the counting operation while respective totals of the money of different denominations provided by said totaling means through a plurality of counting operations of said counting machine in a transaction are printed out by said printing means in accordance with an instruction indicative of completion of the transaction. Namely, in the system of the present invention, the money is counted automatically by the counting machine and the count results are printed out by the printing means. Furthermore, in the case where a plurality of counting operations are performed in the system of the present invention, the respective totals of money of different denominations obtained through the counting operations are printed out in accordance with the instruction indicative of completion of the transaction.

For the same purpose, the system of the type referred to above is provided with an input means for setting an amount of the money used in the transaction as an input supplied to said cash register and a memory means for storing the amount supplied by said input means with said input means being incorporated in said cash register, whereby proof collation is performed between the content stored in said memory means and the count information supplied by said counting machine. Then, on the basis of a result of the collation, an operation stop command is given to the cash counting machine and at the same time, the amount is registered in the cash register.

BRIEF DESCRIPTION OF THE DRAWINGS

These and other objects and features of the present invention will become apparent from the following description taken in conjunction with the preferred embodiment thereof with reference to the accompanying drawings, in which;

FIGS. 4(a) and 4(b) are flow charts showing the respective sequences of operation of the cash register and the counting machine both used in the accounting system shown in FIG. 3, FIGS. 7(a) and 7(b) are flow charts similar to FIGS. 4(a) and 4(b), respectively, showing the respective sequences of operation of the cash register and the cash counting machine used in the cash accounting system of FIG. 6.

DETAILED DESCRIPTION OF THE INVENTION

Figure 1:
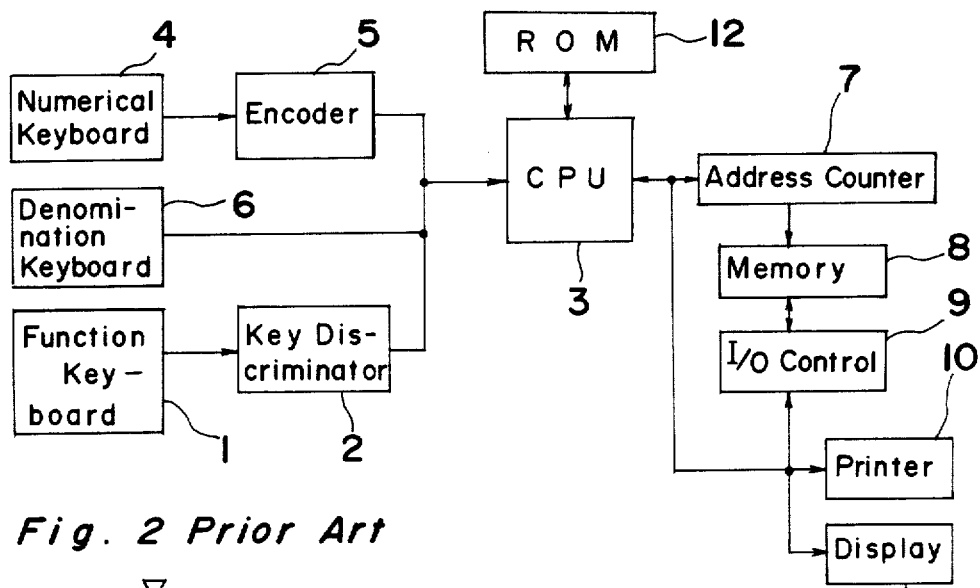
FIG. 1 is a schematic block diagram showing a prior art cash register.
Figure 2:
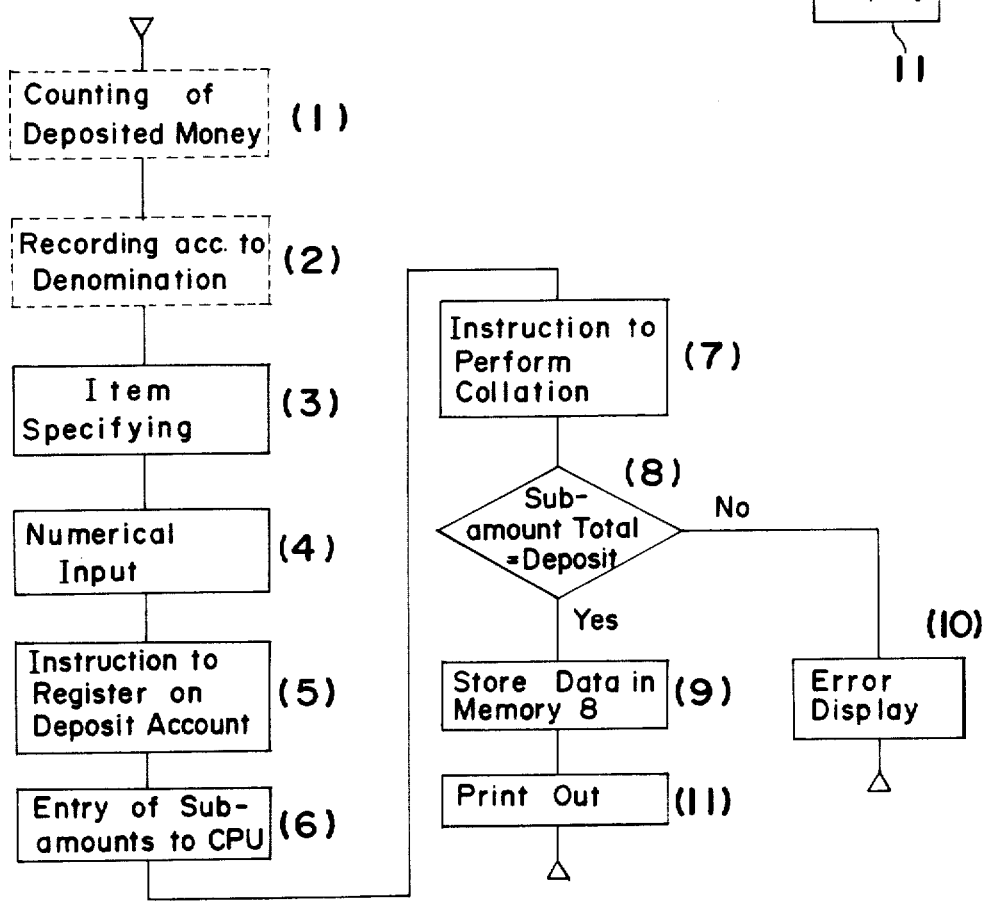
FIG. 2 is a flow chart showing the sequence of operation of a prior art cash accounting system utilizing the cash register shown in FIG. 1.

Before the description of the present invention proceeds, it is to be noted that like parts are designated by like reference numerals throughout FIGS. 3 to 7.

Figure 3:
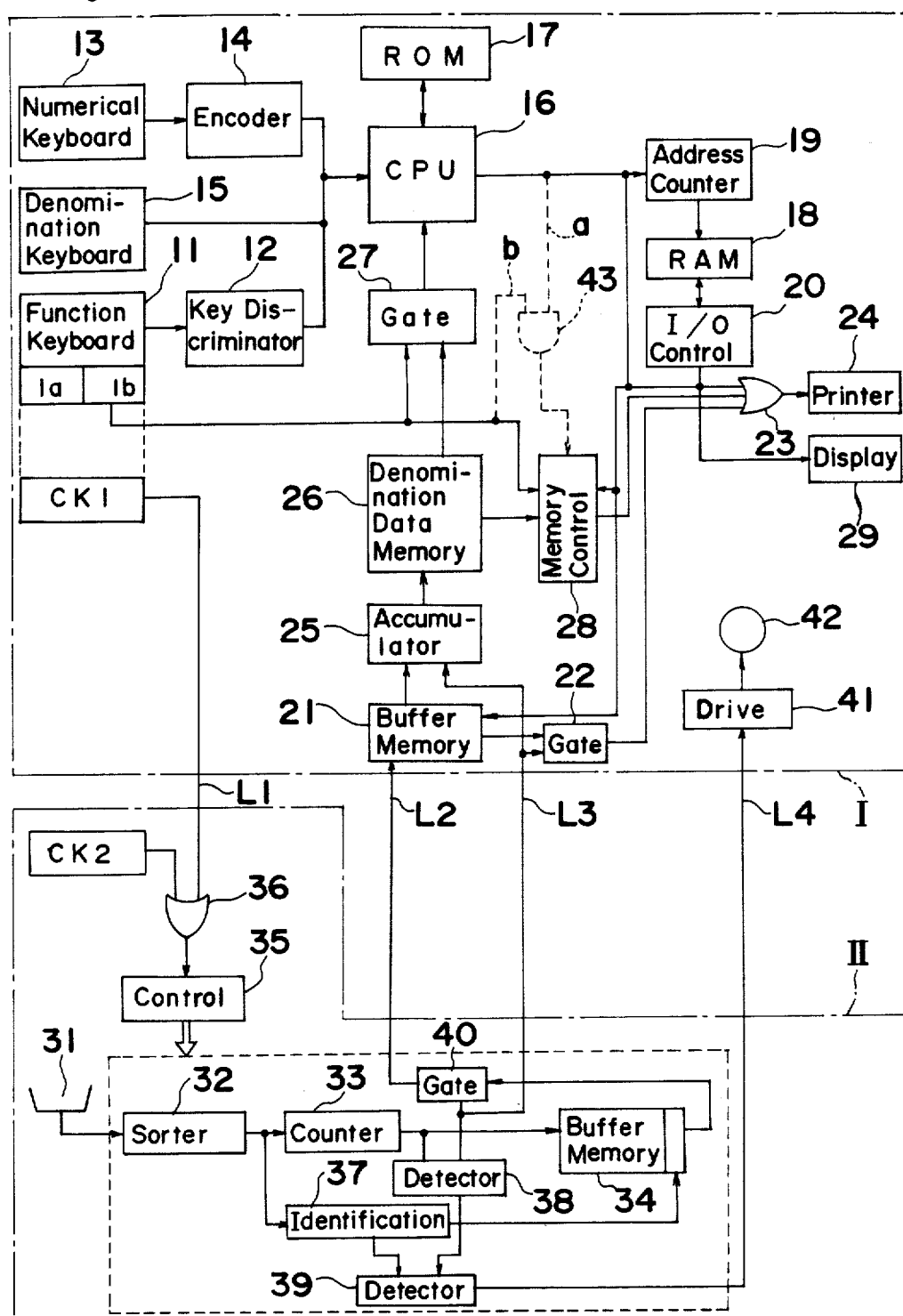
FIG. 3 is a schematic block diagram showing a cash accounting system according to a preferred embodiment of the present invention.

Referring now to FIG. 3, a cash accounting system shown therein comprises a cash register I and a counting machine II both electrically connected to each other through connection lines L1, L2 and L3. The cash register I comprises a function keyboard 11 having a plurality of function keys including a deposit key 1a, a check key 1b and a count start key CK1, a key discriminator 12 connected with the function keyboard 11, a numerical keyboard 13, a key encoder 14 for the numerical keyboard 13, and a denomination keyboard 15. The cash register I also comprises a central processing unit (hereinafter referred to as "CPU") 16, a read-only memory (hereinafter referred to as "ROM") 17 for storing a program necessary to control the sequence of operation of the CPU, a random access memory (hereinafter referred to as "RAM") 18 for storing input data as well as results of calculations, and an address counter 19 for designating the address of the RAM 18 so that information can be transmitted between it and the RAM 18 through an input/output control unit 20.

The cash register I further comprises a buffer memory 21 for temporarily storing count information of different denominations supplied from the counting machine II through the connection line L2, a gating circuit 22 triggered in response to a signal supplied, through the connection line L3, from the counting machine II so as to supply the contents of the buffer memory 21 to a printer unit 24 through an OR gate 23, an accumulator unit 25 for adding the contents of the buffer memory 21 and the contents of a denomination data memory 26 so as to store the result of the addition in the denomination data memory 26. It is so arranged that the contents stored in the denomination data memory 26 are supplied to the CPU 16 through a gating circuit 27 triggered in response to an operating signal from the check key 1b and are read out by a memory control unit 28 so as to be supplied to the printer unit 24 through the OR gate 23. It is also to be noted that a reference numeral 29 represents a display unit for displaying various input information and the result of calculation and the printer unit 24 prints the various input information and the result of calculation on a recording medium such as a paper.

The counting machine II comprises a tray 31 for receiving money to be deposited, which money may include one or both of papers and coins, a sorter unit 32 for sorting the deposited money according to the denomination, a counter unit 33 for counting the money of different denominations, and a buffer memory 34 for storing the respective sub-amounts of money of different denominations. The contents stored in the buffer memory 34 are transferred to the buffer memory 21 through a gating circuit 40. The counting machine II also comprises a control unit 35 operable in response to an output from an OR gate 36 to drive both of the sorter unit 32 and the counter unit 33, a denomination identification unit 37 for identifying the respective denominations in response to an output from the sorter unit 32, a detector unit 38 for detecting the completion of the counting operations for the respective denominations in response to an output signal from the counter unit 33, and a detector unit 39 for detecting the completion of one counting operation in response to an output from the detector unit 38 and an output from the denomination identification unit 37. It is to be noted that the output from the OR gate 36 is indicative of the manipulation of either the count start key CK1 provided in the cash register I or a similar count start key CK2 provided in the cash counting machine II and, for this purpose, the gate 36 has one input terminal connected to the count start key CK1 through the connection line L1 and the other to the count start key CK2. The output from the detector unit 39 is supplied to the cash register I through the connection line L4 so as to trigger a lamp drive circuit 41 so that a lamp 42 may be turned on.

Figure 4A:
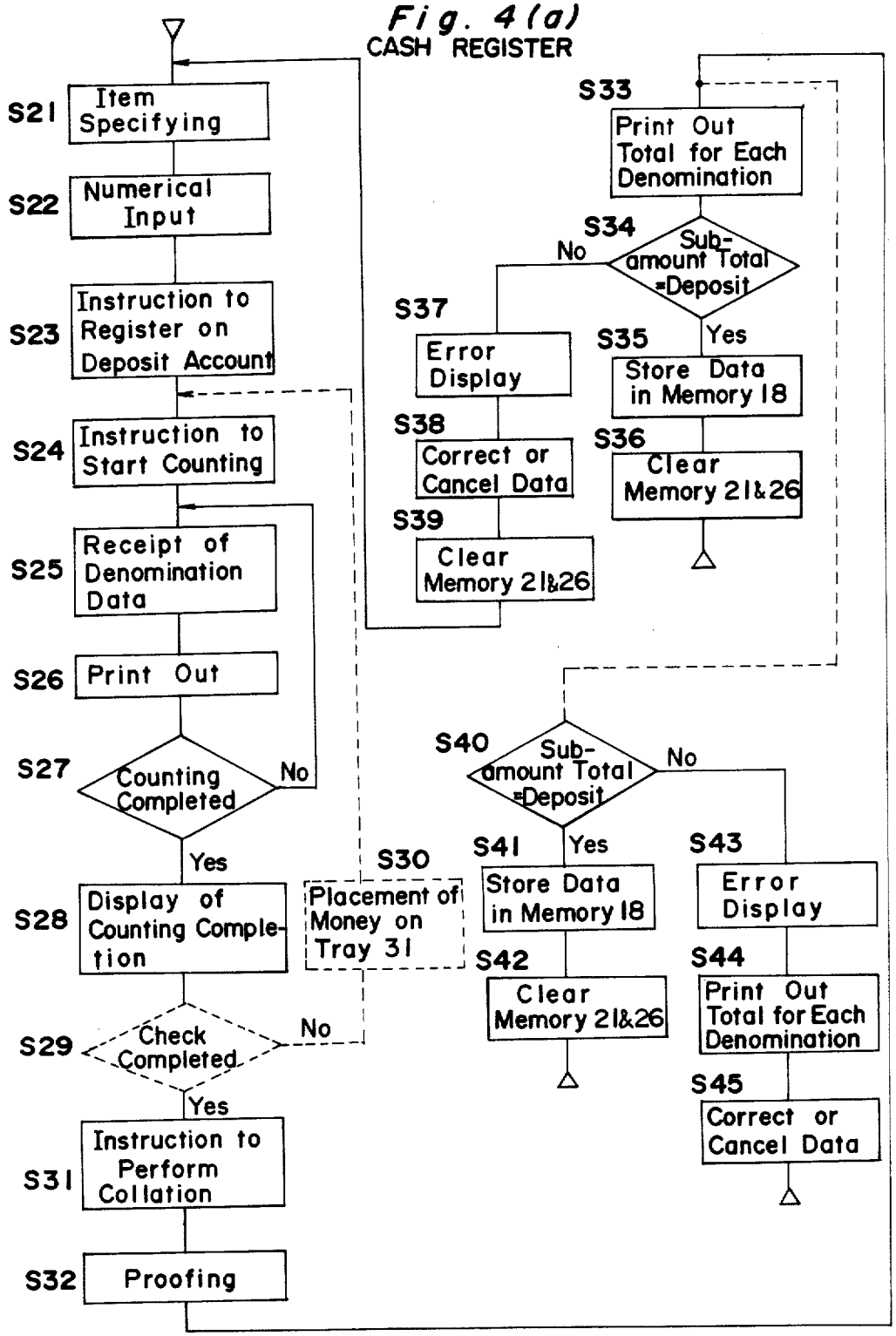

The operation of the system of the construction hereinabove described will now be described with particular reference to FIG. 4 wherein FIGS. 4(a) and 4(b) are flow charts illustrating the respective sequences of operation of the cash register I and the counting machine II. In the case where a customer deposits a certain amount of money, for example 540 dollars, in the ordinary account, the operator places the money on the tray 31 of the counting machine II at the stage S51 and depresses one of the item specifying keys of the function keyboard 11 of the cash register I to develop a signal indicating that the subsequent operations are associated with the ordinary account is applied to the CPU 16 at the stage S21. Then, the operator manipulates the numerical keyboard 13 so as to transmit, through the key encoder 14, to the CPU 16 a signal indicative of the amount of money of 540 dollars for transaction at the stage S22 and manipulates the deposit key 1a of the function keyboard 11 to transmit to the CPU 16 a signal indicating that the transaction is a deposit at the stage S23. Thereafter, by depressing the count start key CK1 of the function keyboard 11, an instruction indicative of start of counting is given to the counting machine II through the OR gate 36 and the control unit 35 at the stage S24. On the instruction, the sorter unit 32 of the counting machine II sorts the money placed on the tray 31 at the stage S51, according to denominations at the stage S53 and the counter unit 33 counts the money according to denominations at the stage S54. It is to be noted that the count data obtained at the stage S54 are temporarily stored in the buffer memory 34 together with denomination information from the denomination identification unit 37.

When a sub-amount of the money of one denomination has been counted, the detector unit 38 is actuated at the stage S55, so that a signal indicating that the sub-amount of the money of the one denomination has been counted is supplied to the detector unit 39 and the gating circuit 40 is triggered. Then, denomination information indicative of the one denomination and information indicative of the number of papers of the one denomination are transferred to the buffer memory 21 of the cash register I at the stages S56 and S25. The data thus stored in the buffer memory 21 are printed out on a journal paper by the printer unit 24 through the gating circuit 22 and the OR gate 23 at the stage S26 and are stored in the denomination data memory 26 according to denominations after the addition has been performed at the accumulator unit 25. When the respective sub-amounts of the money of all the denominations have been thus counted, the detector unit 39 for detecting the completion of one counting operation is actuated so as to transmit a signal indicative of the completion of the one counting operation at the stages S57 and S58, so that the lamp drive circuit 41 is triggered so as to turn on the lamp 42, thus informing the operator that the money placed on the tray 31 has been counted at the stage S28. At this moment operation of the counting machine II is stopped at the stage S59.

Figure 5:
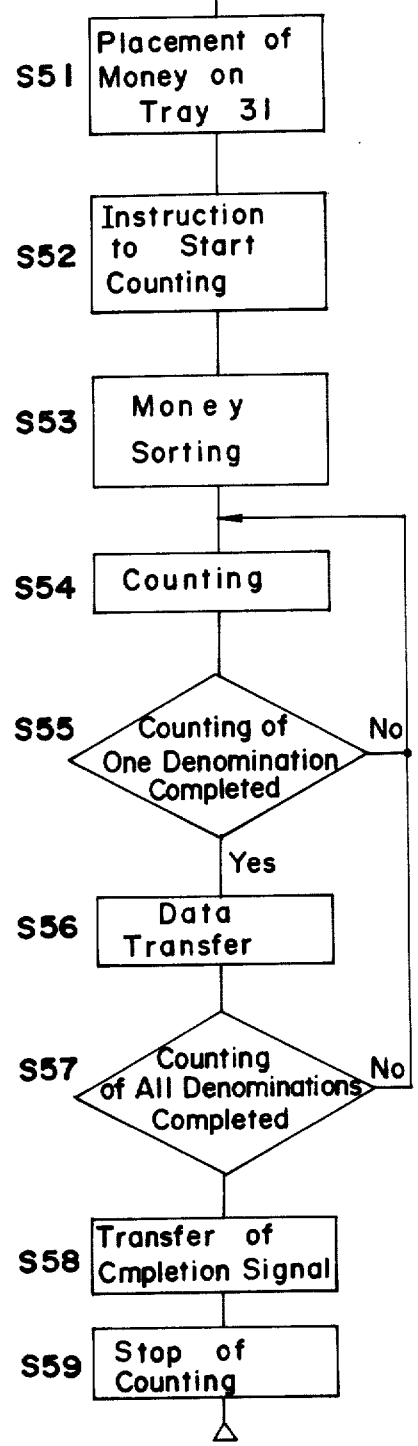
FIG. 5 is a view explanatory of an example of printout of the cash register of FIG. 3.
Figure 5:
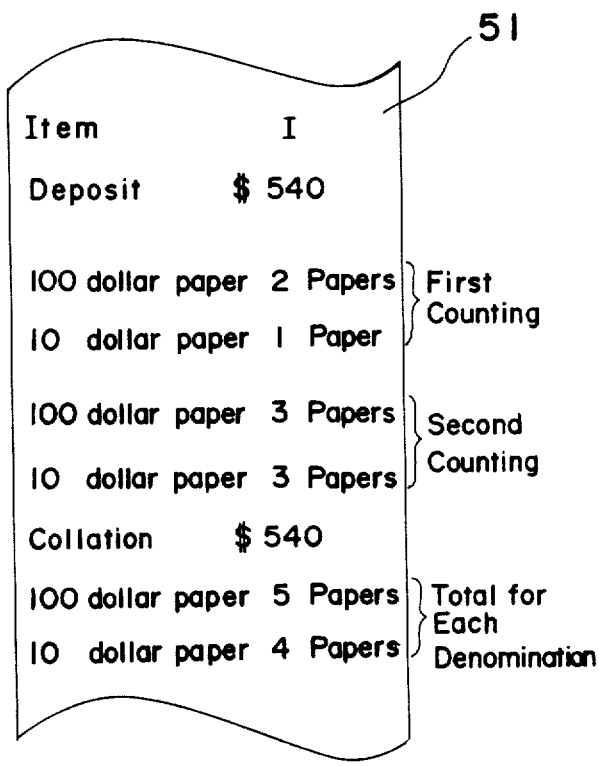

Thus, the one counting operation has been completed. However, in the case where all the money deposited cannot be counted by the one counting operation, the operator places again the money on the tray 31 at the stage S30 and depresses the count start key CK2 of the counting machine II or the count start key CK1 of the cash register I at the stage S31. When the instruction indicative of start of counting has thus been given, the subsequent operations are performed in the same manner as described above while the count data are printed out on a journal paper 51 by the printer unit 24 as shown in FIG. 5 and are added according to the denominations in the denomination data memory 26.

Thus, when all the money deposited has been counted at the stage S29, the operator depresses the check key 1b of the function keyboard 11 so as to provide to the CPU 16 through the key discriminator 12, a collation instruction to see if the money data from the counting machine II is equal to the amount of money deposited at the stage S31, which amount of money deposited has been already supplied from the numerical keyboard 13 to the CPU 16 at the stage S22. When the check key 1b is depressed, the data stored in the denomination data memory 26 is supplied to the CPU 16 through the gating circuit 27, so that the total of the sub-amounts is obtained and, at the same time, the respective sub-amounts of money of different denominations stored in the denomination data memory 26 are printed out, through the memory control unit 28 and the OR gate 23, on the journal paper 51 by the printer unit 24 at the stage S33 as shown in FIG. 5.

When the above described collation instruction is given to the CPU 16, the CPU 16 performs, at the stage S32, a proofing operation. When the proofing operation leads to a decision that the total of the sub-amounts is equal to the amount of money deposited at the stage S34, the data from the numerical keyboard 13 and from the denomination data memory 26 is stored in a predetermined area of the RAM 18 through the input/output control unit 20 at the stage S35, which predetermined area is designated by the address counter 19. Then, the contents stored in the denomination data memory 26 and the buffer memory 21 are cleared for the next succeeding operation at the stage S36.

On the other hand, if the proofing operation leads to a decision that the total of the sub-amounts is not equal to the amount of money deposited, the CPU 16 causes the display unit 29 to indicate the error display at the stage S37. When the operator notices the error display, he gives an instruction to perform correction and cancellation at the stage S38 so as to clear the contents stored in the denomination data memory 26 and the buffer memory 21 at the stage S39. Then, the stage S39 is returned to the stage S21 so as to perform registration of the same transaction again.

Meanwhile, it is so arranged in the embodiment that, when the collation instruction has been given to the CPU 16, the contents stored in the denomination data memory 26 are bound to be printed out. However, the printout is not necessarily required in the case where the proofing operation leads to the decision that the both are equal to each other. Accordingly, needless to say, it can be so arranged that the printout is performed only in the case where the proofing operation leads to the decision that the both are not equal to each other.

Namely, more specifically, it can be so arranged that an AND output composed of a disagreement detection signal a from the CPU 16 and a collation instruction signal b is supplied from the AND gate 43 to the memory control unit 28 and thus, the memory control unit 28 is actuated so that the respective sub-amounts of money of different denominations may be printed out by the printer unit 24. It is to be noted the sequences of operation of the cash register I in the above described case are illustrated in the subsequent stages S40 to S45 in FIG. 4(a).

Figure 6:
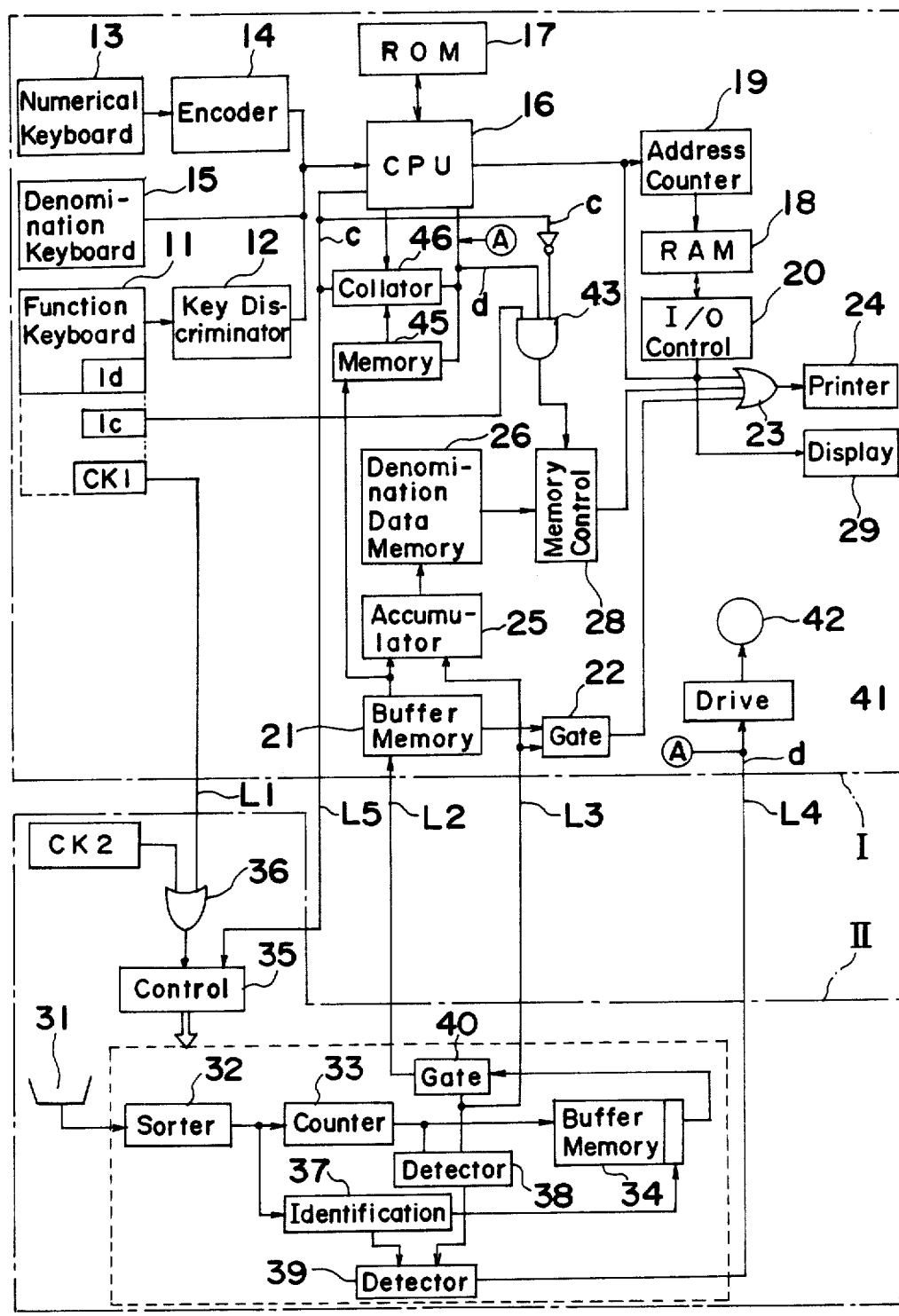
FIG. 6 is a diagram similar to FIG. 3, showing a cash accounting system according to another preferred embodiment of the present invention.

FIG. 6 is a block diagram similar to FIG. 3, showing a cash accounting system according to another preferred embodiment of the present invention.

In the embodiment shown in FIG. 6, the cash register I is electrically connected with the counting machine II through connection lines L1, L2, L3, L4 and L5. Since most of the components of the cash accounting system of FIG. 6 are substantially identical with those of the cash accounting system of FIG. 3, they are designated by the same reference numerals as in FIG. 3 and only the difference will be described for the sake of brevity.

In the cash register II shown in FIG. 6, it is so arranged that the contents stored in the denomination data memory 26 are read out by the memory control unit 28 adapted to be operated in response to an output signal from the AND gate 43 so as to be supplied to the printer unit 24 through the OR gate 23 with the AND gate 43 being controlled by an inverter signal of a collation result c of a collator unit 46 to be described later. Meanwhile, it is so arranged that the contents stored in the buffer memory 21 are supplied to an addition memory unit 45 so as to be converted into money information to be stored after addition thereof, so that the contents stored in the addition memory unit 45 and the money information stored in the CPU 16 are supplied to the collator unit 46 for collation thereof and thus, the collation result c is supplied to the CPU 16 and, at the same time, given to the control unit 35 of the counting machine II through the connection line L5.

Figure 7B:
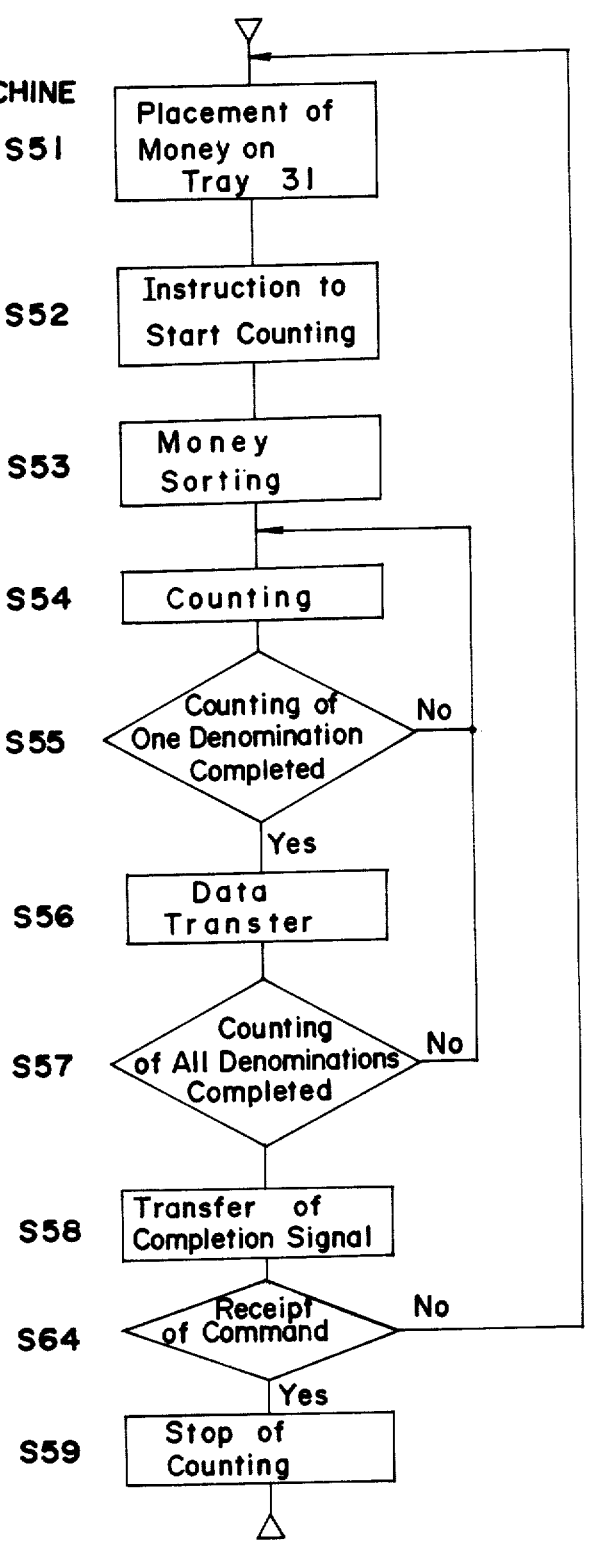

The operation of the system according to the embodiment shown in FIG. 6 will now be described with reference to FIG. 7 wherein FIGS. 7(a) and 7(b) are flow charts illustrating the respective sequences of operation of the cash register I and the counting machine II.

Since most of the stages of the flow charts of FIGS. 7(a) and 7(b) are substantially identical with those of the flow charts of FIGS. 4(a) and 4(b), respectively, they are designated by the same reference numerals as those in FIGS. 4(a) and 4(b), respectively and only the difference will be described for the sake of brevity.

Referring to FIGS. 7(a) and 7(b), data stored in the buffer memory 21 is printed out on the journal paper 51 by the printer unit 24 through the gating circuit 22 and the OR gate 23 as shown in FIG. 5 at the stage S26 and, at the same time, stored in the denomination data memory 26 after addition thereof according to the denominations through the accumulator unit 25 at the stage S60. Further, the data is supplied to the addition memory unit 45 so as to be stored, after addition thereof, in an internal memory of the addition memory unit 45 at the stage S61 with the data being converted into the money information.

When the respective sub-amounts of the money of all the denominations have been counted as described above, the detector unit 39 is actuated to transmit a counting completion signal d at the stages S57 and S58. By the completion signal d the lamp drive circuit 41 is triggered so as to turn on the lamp 42, thus informing the operator that the money placed on the tray 31 has been counted at the stage S28.

Meanwhile, the counting completion signal d is supplied to the CPU 16 and, at the same time, actuates the collator unit 46 so as to check to see if the money information supplied from the numerical keyboard 13 at the stage S22 is equal to the money information stored in the addition memory unit 45 at the stage S34. If both are equal to each other, the stop signal c is supplied from the collator unit 46 to the counting machine II through the connection line L5 at the stage S62 and is also fed to the CPU 16. When the CPU 16 has received the stop signal c, the CPU 16 supplies the above described input data to a predetermined area of the RAM 18 through the input/output control unit 20 at the stage S35, which predetermined area is designated by the address counter 19. At the same time, the data stored in the buffer memory 21, denomination data memory 26 and addition memory unit 45 are cleared for the subsequent transaction at the stage S36.

Meanwhile, when the counting machine II has recieved the stop signal c, operation of the counting machine II is stopped so as not to receive a signal from the count start keys CK1 and CK2 at the stage S59. It is to be noted that this state is maintained until the amount of money deposited has been registered on the cash register I. On the other hand, unless the data to be collated with each other by the collator unit 46 are equal to each other, an error display is performed by the display unit 29 at the stage S37. If the operator has noticed the error display and all the money deposited has not yet been counted, the operator places the remaining money on the tray 31 at the stage S30 and gives the instruction to start the counting again at the stage S24, so that the above described sequences of operation are performed so as to complete the counting of all the money deposited.

If the data to be collated with each other by the collator unit 46 are not equal to each other when all the money deposited has thus been counted, the operator depresses a correction key 1c or a cancel key 1d of the function keyboard 11 so as to recheck the transaction at the stage S38. When the correction key 1c or the cancel key 1d has been depressed, the memory control unit 28 is actuated through the AND gate 43, so that the respective sub-amounts of money of different denominations stored until then in the denomination data memory 26 are printed out by the printer unit 24 through the memory control unit 28 and the OR gate 23 at the stage S63.

Furthermore, when the correction key 1c or the cancel key 1d has been depressed, the data stored in the buffer memory 21, denomination data memory 26 and addition memory unit 45 are cleared for the subsequent transaction after completion of the above described sequences of operation at the stage S39.

As is clear from the foregoing, in accordance with the present invention, since the cash register is connected with the counting machine so that the count data of the counting machine may be printed out for each counting operation with the respective sub-amounts of money of different denominations counted by the counting machine being printed out in response to an instruction to perform collation, from the cash register, a cash accounting system which is remarkably useful for confirmation in each transaction can be obtained.

Furthermore, in accordance with the present invention, if the count result is equal to the proof value supplied from the cash register, the subsequent processing for registration is automatically performed. Furthermore, in the case where the count result is not equal to the proof value, the respective sub-amounts of of money of different denominations stored until then are printed out and thus, a cash register which is easy to operate is provided.

Although the present invention has been fully described by way of example with reference to the accompanying drawings, it is to be noted that various changes and modifications will be apparent to those skilled in the art. Therefore, unless otherwise such changes and modifications depart from the present invention, they should be construed as included therein.

What is claimed is:

1. A cash accounting system which comprises, in combination:
   a cash register for recording various transactions of money;

a counting machine electrically connected with said cash register and operable to count the money including papers and coins used during each of the transactions;

printing means; and totaling means for totaling according to denomination count data developed by said counting machine;

said printing means and said totaling means being provided in either one of said cash register and said counting machine;

whereby money information developed by said counting machine as a result of a counting operation is printed out by said printing means in response to completion of the counting operation while respective totals of the money of different denominations developed by said totaling means through a plurality of counting operations of said counting machine in a transaction are printed out by said printing means in accordance with an instruction indicative of completion of the transaction.

2. A system as claimed in claim 1, further including:

input means for introducing an amount of the money used in the transaction as an input supplied to said cash register, said input means being provided in said cash register;

memory means for storing the amount supplied by said input means;

collating means for performing a proof collation between the amount stored in said memory means and the count data supplied by said counting machine; and control means for providing an operation stop command to said counting machine to cause said cash register to register the amount therein, on the basis of a result of the proof collation performed by said collating means.

* * * * *